(12) United States Patent
Gresham et al.

(10) Patent No.: US 8,971,690 B2
(45) Date of Patent: Mar. 3, 2015

(54) TECHNIQUE TO COORDINATE ACTIVITIES BETWEEN A CONTENT DEVICE AND A WIRELESS DEVICE BASED ON CONTEXT AWARENESS

(71) Applicants: Timothy J. Gresham, Portland, OR (US); John C. Weast, Portland, OR (US)

(72) Inventors: Timothy J. Gresham, Portland, OR (US); John C. Weast, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 13/708,672

(22) Filed: Dec. 7, 2012

(65) Prior Publication Data
US 2014/0161414 A1 Jun. 12, 2014

(51) Int. Cl.
*H04N 5/775* (2006.01)
*H04N 5/76* (2006.01)
*H04N 21/414* (2011.01)
*H04N 21/436* (2011.01)
*H04N 21/4363* (2011.01)
*H04W 8/00* (2009.01)
*H04N 5/765* (2006.01)

(52) U.S. Cl.
CPC ........... *H04N 5/76* (2013.01); *H04N 21/41407* (2013.01); *H04N 21/43615* (2013.01); *H04N 21/43622* (2013.01); *H04N 21/43637* (2013.01); *H04W 8/005* (2013.01); *H04N 5/765* (2013.01)

USPC .......................................................... 386/230

(58) Field of Classification Search
None
See application file for complete search history.

(56) References Cited

U.S. PATENT DOCUMENTS

| 5,706,388 A * | 1/1998 | Isaka .............................. 386/206 |
| 8,509,589 B2 * | 8/2013 | Park et al. ...................... 386/200 |
| 2002/0023266 A1 * | 2/2002 | Kawana et al. ................... 725/81 |
| 2004/0204020 A1 * | 10/2004 | Kuramitsu ................... 455/550.1 |
| 2006/0130116 A1 * | 6/2006 | Shi et al. ........................ 725/134 |

* cited by examiner

*Primary Examiner* — Huy T Nguyen
(74) *Attorney, Agent, or Firm* — Blakely, Sokoloff, Taylor & Zafman LLP

(57) ABSTRACT

A content device such as a digital video recorder may be coupled to a television and a viewer of the television may receive an incoming call on a wireless device such as a mobile phone while viewing content on the television. The content device and wireless device may be paired with each other and the wireless device may send a notification to the content device in response to detecting an incoming call. The content device may pause the program displayed on the television and then initiate recording of the program. The wireless device may send a second notification to the content device in response to ending the call and the content device may stop recording the program and resume the program on the television. The coordination between the content device and the wireless device and the television may be based on the context awareness and independent of the user intervention.

19 Claims, 5 Drawing Sheets

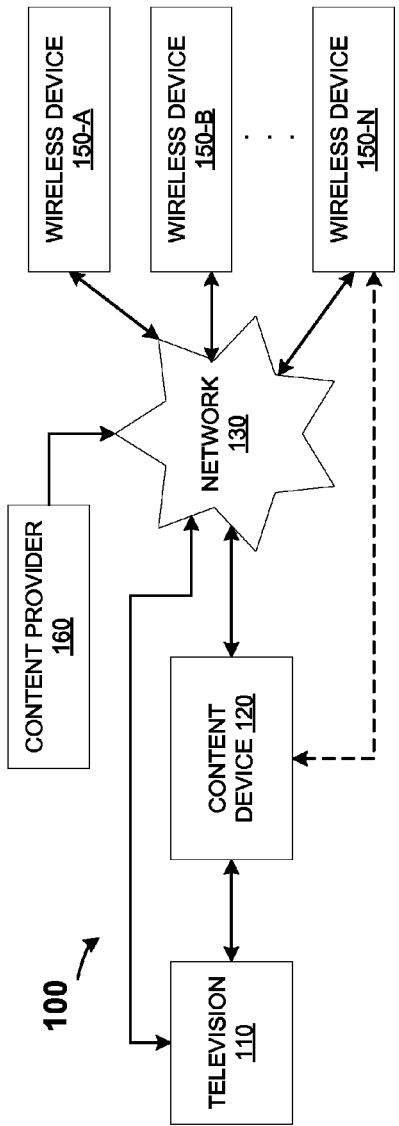
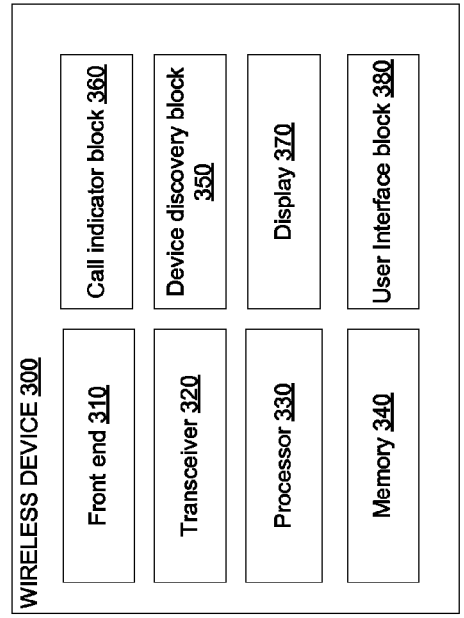
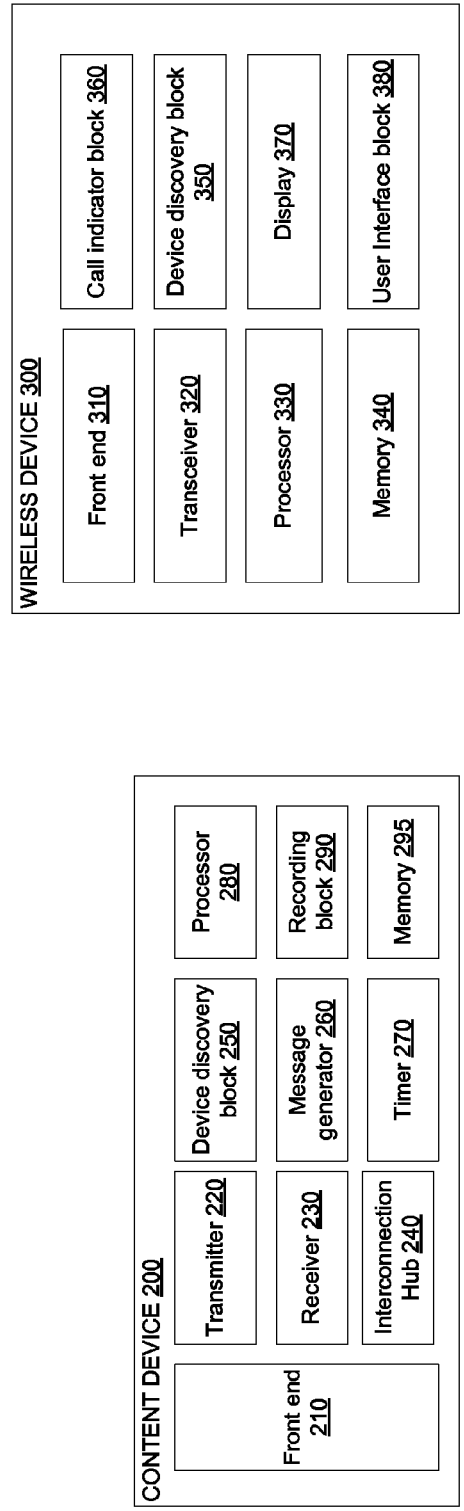

TECHNIQUE TO COORDINATE ACTIVITIES BETWEEN A CONTENT DEVICE AND A WIRELESS DEVICE BASED ON CONTEXT AWARENESS

BACKGROUND

At least sometimes a viewer may receive an incoming call on their wireless device such as a mobile phone while watching a television program. The viewer may fumble for a remote controller to put a content device (such as digital video recorder DVR) on a 'record' mode to record the program (or content) being watched on a television in response to receiving an incoming call on a wireless device. Even if the viewer is able to find to the remote controller to pause the content device, the rewind buffer of the content device may not be large enough to record the content until the user gets back to viewing the program. Presently, there is no mechanism to coordinate activities between the content device and the wireless devices based on the context awareness.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates an environment 100, which may support a mechanism to coordinate activities between a content device and a wireless device based on context awareness in accordance with one embodiment.

FIG. 2 illustrates a block diagram of a content device 200, which may support a mechanism to coordinate activities with a wireless device based on context awareness in accordance with one embodiment.

FIG. 3 illustrates a block diagram of a wireless device 300, which may support a mechanism to coordinate activities with a content device based on context awareness in accordance with one embodiment.

DETAILED DESCRIPTION

Figure 4:
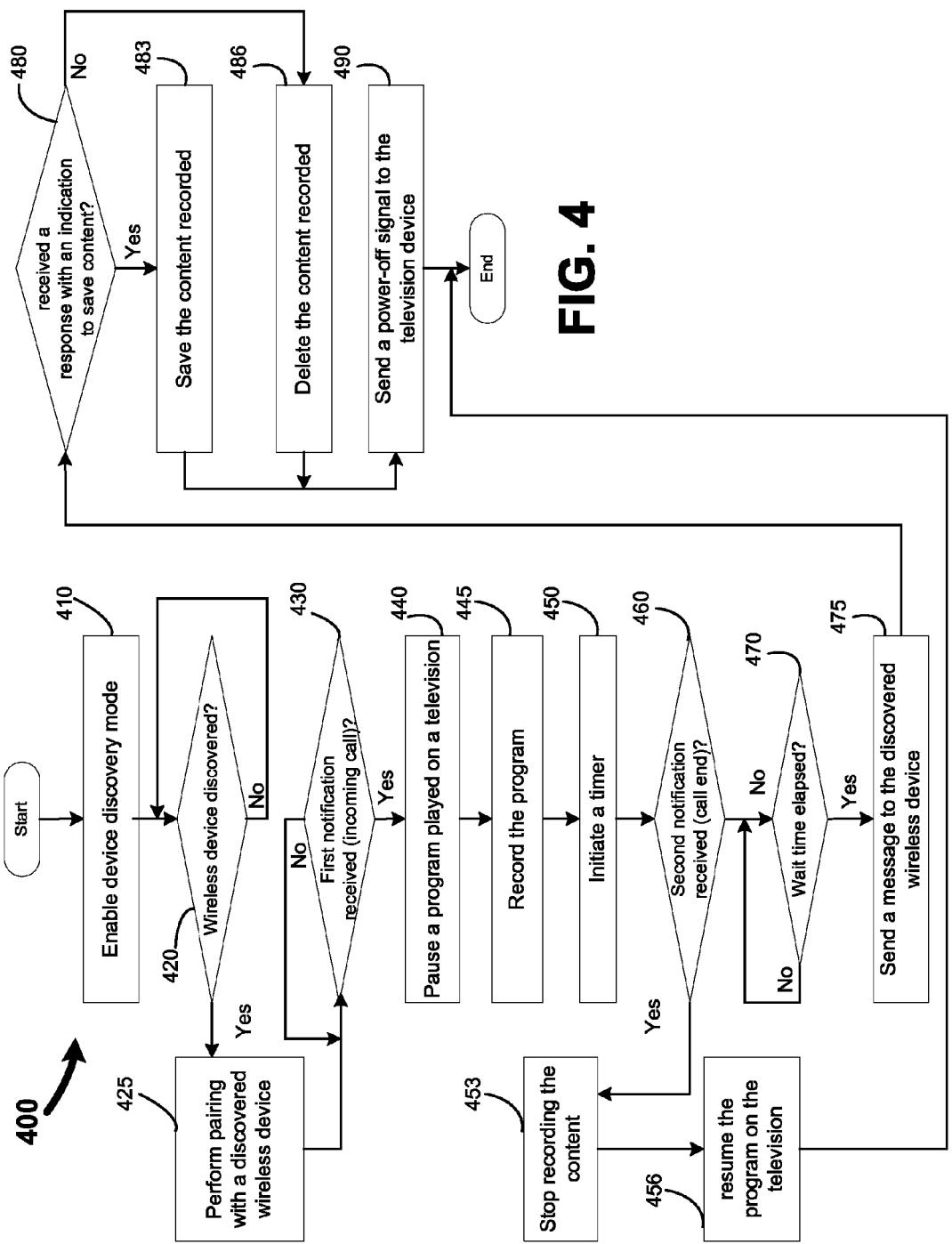
FIG. 4 is a flow-chart, which illustrates an operation of the content device 200, which may support a mechanism to coordinate activities with a wireless device based on context awareness in accordance with one embodiment.

The following description describes embodiments of a mechanism to coordinate activities between a content device and a wireless device based on context awareness in accordance with one embodiment. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

The content device may be coupled to a television and a viewer may receive an incoming call on a wireless device such as a mobile phone while viewing the content displayed on the television. In one embodiment, the content device and the wireless device may be paired with each other and the wireless device may send a first notification to the content device in response to detecting an incoming call. In one embodiment, the content device may pause the program displayed on the television and then initiate recording of the program. In one embodiment, the wireless device may send a second notification to the content device in response to ending the call and the content device may stop recording the program and resume the program on the television.

In one embodiment, the content device may wait for a pre-determined time period before sending a message to the wireless device if the content device does not receive a second notification from the wireless device. In one embodiment, the wireless device may send a response after receiving the message and the message may include an indication either to save the content recorded or discard the content recorded. In one embodiment, the content device may save the content or discard the content based on the response received from the wireless device.

An embodiment of an environment 100, which may support a mechanism to coordinate activities between a content device and a wireless device based on context awareness is illustrated in FIG. 1. In one embodiment, the environment 100 may include a television 110, a content device 120, a network 130, and a plurality of wireless devices 150-A to 150-N. In one embodiment, the television 110 and the content device 120 may be coupled to each other and the viewer may be viewing the program displayed on the screen of the television. In one embodiment, the viewer may also have a wireless device 150 such as a mobile phone. In one embodiment, the television 110, the content device 120, and the wireless device 150-A may be located in the same vicinity such as within a living room, for example.

In one embodiment, the network 130 may include cellular networks, television networks and other telecommunication networks. The network 130 may support 2G, 3G, 4G, UMTS, CDMA, cable, satellite, TCP/IP, IEEE® wireless network standards and such other network technologies to allow transfer of data between the devices manufactured based on various standards.

The content provider 160 may provide content, which may be consumed by the television 110. In one embodiment, the content provider 160 may refer to a live telecast or a recorded version of the program stored in a server or any other such device. The content provider 160 may support delivery of the content to the television 110 through a cable or a satellite television network supported by the network 130.

In one embodiment, the content device 120 may support device discovery techniques to discover devices such as the wireless device 150-A, for example, within the vicinity of the content device 120. In one embodiment, the content device 120 may perform pairing with the wireless device 150-A, which is discovered during the device discovery phase. However, for example, the wireless device 150-B may not be in the vicinity of the content device 120 and thus may not be discovered and therefore the content device 120 may not be paired with the wireless device 150-B. In one embodiment, the content device 120 may pause the television 110 and start recording the content (or program) in response to receiving a first notification from the wireless device 150-A, which may be paired with the content device 120. In one embodiment, the content device 120 may resume display of the program on the television and stop recording the content in response to receiving a second notification from the wireless device 150-A.

However, in other embodiments, the content device 120 may send an indication to the wireless device 150-A if the content device 120 does not receive the second notification after waiting for a time period. In one embodiment, the indication may include a message asking the wireless device 150-A to provide a response to either store (or save) the recorded content or delete the recorded content. In one embodiment, the content device 120 may save the recorded content if the response includes a first value and delete the recorded content if the response includes a second value. In one embodiment, the content device 120 may switch off the television after either storing or deleting the recorded content.

In one embodiment, the wireless device 150 may support device discovery mechanism to discover the devices within the vicinity of the wireless device 150. In one embodiment, the wireless device 150-A may discover the content device 120 while performing the device discovery mechanism. In one embodiment, the wireless device 150-A may perform pairing with the content device 120 or respond to the pairing signals sent by the content device 120. In one embodiment, the wireless device 150-A may detect an incoming call and then send the first notification to the content device 120. In one embodiment, the wireless device 150-A may send the second notification after completing the call or after the call has ended. In one embodiment, the wireless device 150-A may send the first notification and the second notification based on the context awareness and without intervention from the user (or viewer) of the wireless device 150-A.

An embodiment of a content device 200, which may support a mechanism to coordinate activities with a wireless device based on context awareness, is illustrated in FIG. 2. In one embodiment, the content device 200 may comprise a front end 210, a transmitter 220, a receiver 230, interconnection hub 240, device discovery block 250, message generator 260, timer 270, processor 280, recording block 290, and a memory 295. In one embodiment, the front end 210 may include wired and wireless interface components such as antennas, radio frequency components, amplifiers, and noise reduction blocks, switches, for example. In one embodiment, the front end 210 may include components to transfer outbound data from the transmitter 220 to a wired or wireless medium and to receive inward data from the wired or wireless medium and provide the inward data to the receiver 230.

In one embodiment, the transmitter 220 may be provided with one or more signals or data units generated the device discovery block 250 and the processor 280 through an interconnection hub 240. In one embodiment, the transmitter 220 may perform modulation and other such operations before transmitting the one or more signals and data units. In one embodiment, the receiver 230 may receive one or more signals or data units from cellular or data networks or the wireless device 150-A and may demodulate and process such signals and data units before forwarding the signals and data units to one or more of the blocks of the content device 200.

In one embodiment, the device discovery block 250 may generate polling signals to poll the wireless devices within the vicinity of the content device 200. In one embodiment, the device discovery block 250 may receive a discovery response signals to the polling signals from one or more wireless devices such as the wireless devices 150. In one embodiment, the response may include information such as an identifier of the wireless device, location coordinates of the wireless device, or any other such information, which may enable the device discovery block 250 to identify the wireless device and the location of the wireless device. In other embodiments, the device discovery block 250 may receive beacon or heart-beat signals, or location information of the wireless devices, at regular intervals of time. In one embodiment, the device discovery block 250 may either by itself or with the support of the processor 280 determine the identity of wireless devices, which are within the vicinity of the content device 200. In one embodiment, the device discovery block 250 may identify the wireless devices, which are within the vicinity of the content device 200 based on, for example, the strength of the beacon, or heart-beat signals or the location information. In one embodiment, the device discovery block 250 may discover the wireless devices and then send a pairing signal to the discovered wireless device (for example wireless device 150-A). In one embodiment, the pairing may be either explicit or implicit. In one embodiment, the discovery of the wireless device may include, for example, exchange of interoperability signals based on Digital Living Network Alliance (DLNA) standards, which may be sufficient to perform a loose pairing. In one embodiment, the DLNA may use Universal Plug and Play (UPnP) techniques. In other embodiments, the discovery and pairing may be more explicit and may include, for example, authentication or action techniques based on Bluetooth® or Near Field Communication (NFC). In one embodiment, the device discovery block 250 may share the identification details of the paired wireless device (150-A, for example) with the processor 280.

In one embodiment, the processor 280 may generate one or more signals and data units to enable the content device 200 to support techniques to coordinate activities with a wireless device based on context awareness. In one embodiment, the processor 280 may receive the identification details from the device discovery device 250 that may enable the processor 280 to identify the wireless device 150-A, which may be paired with the content device 200. In one embodiment, the processor 280 may receive a first notification, which may represent an indication of an incoming call, from the paired wireless device 150-A, for example. In one embodiment, the processor 280 may send a signal to pause the television 110 so that the viewer of the television 110 (who is also a user of the wireless device 150-A) may conveniently answer the incoming call. Further, the processor 280 may send another signal to the recording block 290 to record the content (or the program) received by the television 110. In one embodiment, the processor 280 may cause the television 110 to be paused and the program to be recorded based on the context awareness and without any intervention from the viewer of the television 110 (or the user of the wireless device 150-A).

In one embodiment, the processor 280 may initiate the timer 270 to count for a specific amount of time. In one embodiment, the processor 280 may receive a second notification from the wireless device 150-A and the second notification may indicate that the call has ended. In response, the processor 280 may send a signal to the recording block 290 to stop the recording and may resume the program on the television 110. In one embodiment, the processor 280 may send a signal to the message generator 260 if the second notification is not received before the timer 270 elapses the specific amount of time. In one embodiment, the processor 280 may receive a response from the wireless device 150-A to the message sent by the message generator 260. In one embodiment, the processor 280 may cause the recording block 290 to either save the recorded content (or the program) in the memory 295 or may delete the content from the memory 295 based on an indication encoded within the response. For example, the processor 280 may cause the recording block 290 to save the program if the response includes a first indication value and may delete the program if the response includes a second indication value.

An embodiment of a wireless device 300, which may support a mechanism to coordinate activities with a content device based on context awareness, is illustrated in FIG. 3. In one embodiment, the wireless device 300 may include a front end 310, a transceiver 320, a processor 330, a memory 340, a device discovery block 350, a call indicator block 360, a display 370, and a user interface block 380.

In one embodiment, the front end 310 may include wired and wireless interface components such as antennas, radio frequency components, amplifiers, and noise reduction blocks, switches, for example. In one embodiment, the front end 310 may include components to transfer outbound data from the transmitter portion of the transceiver 320 to a wired or wireless medium and to receive inward data from the wired or wireless medium and provide the inward data to the receiver portion of the transceiver 320.

In one embodiment, the transceiver 320 may be provided with one or more signals or data units generated the device discovery block 350 and the processor 330 and perform modulation and other such operations before transmitting the one or more signals and data units. In one embodiment, the transceiver 320 may receive one or more signals or data units from cellular or data networks or the content device 200 and may demodulate and process such signals and data units before forwarding the signals and data units to one or more of the blocks of the wireless device 300.

In one embodiment, the device discovery block 350 may respond to polling signals sent by the content device 200. In one embodiment, while responding the device discovery block 350 may include information such as the identifier of the wireless device or the location information of the wireless device and such other information, which may enable the content device 200 to identify the wireless device and the location of the wireless device. In one embodiment, the device discovery block 350 may send beacon or heart-beat signals, at regular intervals, to indicate the presence of the wireless devices. In one embodiment, the device discovery block 350 may respond to the pairing signals sent by the content device 200.

In one embodiment, the call indicator block 360 may detect an incoming call and send such information to the processor 330. In one embodiment, the call indicator block 360 may pick-up the signals of the in-coming call even before the wireless device may ring and alert the user. In one embodiment, the call indicator block 360 may send such information to the processor 330 even before the wireless device may ring and alert the user. In one embodiment, the call indicator block 360 may also detect when the call ends and may send a signal to the processor 330.

In one embodiment, the processor 330 may receive a signal indicating arrival of an incoming call, generate a first notification, and send the first notification to the content device 200. In one embodiment, the processor 330 may send the first notification to the content device 200 without any intervention from the user (or viewer of the television 110). In one embodiment, the television 110 may be paused and the program may be recorded based on the first notification, which may occur based on the context awareness, which may enable the user (of the wireless device 300) to receive the incoming call without having to worry about pausing the television 110 and recording the program displayed on the television 110. In one embodiment, the processor 330 may receive an indication when the call ends and may send a second notification to the content device 200 and based on the second notification, the program displayed on the television 110 may be resumed and recoding of the program may be stopped.

In one embodiment, the processor 330 may receive a message and display the message on the display 370. In one embodiment, the processor 330 may receive the message if the second notification is not sent within a specified time period, which may counted from a time point based on the sending the first notification. In one embodiment, the processor 330 may receive an input from the user through the user interface block 380 and based on the input the processor 330 may generate a response, which may be sent to the content device 200. In one embodiment, the processor 330 may include a first indication value in the response if the user prefers to save the recorded program and the processor 330 may include a second indication value in the response if the user prefers to delete the recorded program.

An embodiment of an operation of the content device 200, which may support a mechanism to coordinate activities with a wireless device based on context awareness, is illustrated in flow-chart of FIG. 4. In block 410, the content device 200, which may be similar to the content device 120 of FIG. 1, may enable device discovery mode to detect the presence of wireless devices within the vicinity of the content device 200. In block 420, the content device 200 may check if a wireless device is discovered within the vicinity of the content device 200 and control passes to block 425 if the wireless device is detected and to block 430 otherwise.

In block 425, the content device 200 may perform pairing with the discovered wireless device. In block 430, the content device 200 may check if the first notification is received and control passes to block 440 if the first notification is received. In one embodiment, the first notification may indicate that the discovered wireless device is about to receive an incoming call.

In block 440, the content device 200 may pause the program received by the television, which may be coupled to the content device 200. In block 445, the content device 200 may start recording the program. In one embodiment, the program may be stored in a memory during the recording. In block 450, the content device 200 may initiate a timer to keep track of the time elapsed after receiving the first notification.

In block 460, the content device 200 may check if the second notification is received and control passes to block 453 and to block 470 otherwise. In block 453, the content device 200 may stop recording the program. In block 456, the content device 200 may resume the program on the television.

In block 470, the content device 200 may check if the wait time is elapsed and control passes to block 475 if the wait time is elapsed. In block 475, the content device 200 may send a message to the discovered wireless device and may wait for the response from the wireless device. In block 480, the content device 200 may check if the response includes a first indication value, which may indicate that the recorded program is to be saved and control passes to block 483 if the response includes an indication to save the recorded program and control passes to block 486 otherwise. In one embodiment, the content device 200 may receive a response to the message sent if the wireless device has moved out of the vicinity of the content device 200 and the user does not intend to return to the vicinity of the content device 200 for an extended amount of time.

In block 483, the content device 200 may save the recorded program in a memory. In block 486, the content device 200 may delete the recorded program from the memory. In block 490, the content device 200 may send a signal to switch off the television.

Figure 5:
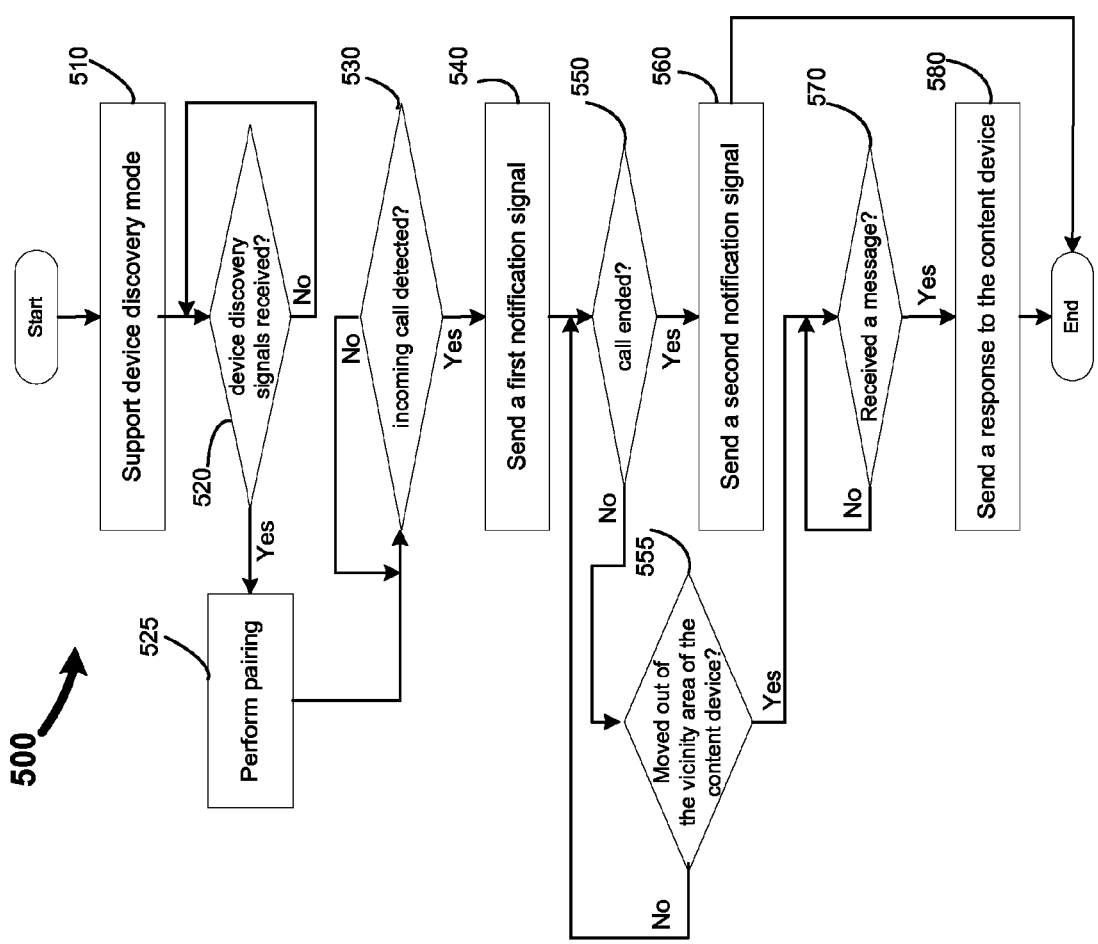
FIG. 5 is a flow-chart, which illustrates an operation of the wireless device 300, which may support a mechanism to coordinate activities with the content device based on context awareness in accordance with one embodiment.

An embodiment of an operation of the wireless device 300, which may support a technique to coordinate activities with a context device based on context awareness, is illustrated in flow-chart of FIG. 5. In block 510, the wireless device 300, which may be similar to the wireless devices 150 of FIG. 1, may support device discovery mode to respond to the device discovery signals received from the content device 200.

In block 510, the wireless device 300 may support device discovery mode. In one embodiment, the wireless device 300 may support a technique to respond to the device discovery signals received from the content device. In block 520, the wireless device 300 may check whether the device discovery signals are received and control passes to block to 525 if the device discovery signals are received. In block 525, the wireless device 300 may perform or respond to the pairing signals to allow the wireless device 300 to be paired with the content device 200.

In block 530, the wireless device 300 may check if an incoming call is about to occur and control passes to block 540 if the wireless detects an occurrence of an incoming call. In block 540, the wireless device 300 may send the first notification to the content device 200. In block 550, the wireless device 300 may check whether the call has ended and control passes to block 560 if the call has ended. In block 555, the wireless device 300 may check if it has moved out of the vicinity area of the content device 200 and control passes to block 570 and to block 550 otherwise. In block 560, the wireless device may send the second notification to the content device 200.

In block 570, the wireless device 300 may check if the message is received and control passes to block 580 if the message is received. In block 580, the wireless device 300 may send a response to the message either by including a first identification value or a second identification value based on whether the user intends to have the recorded content saved or deleted.

Figure 6:
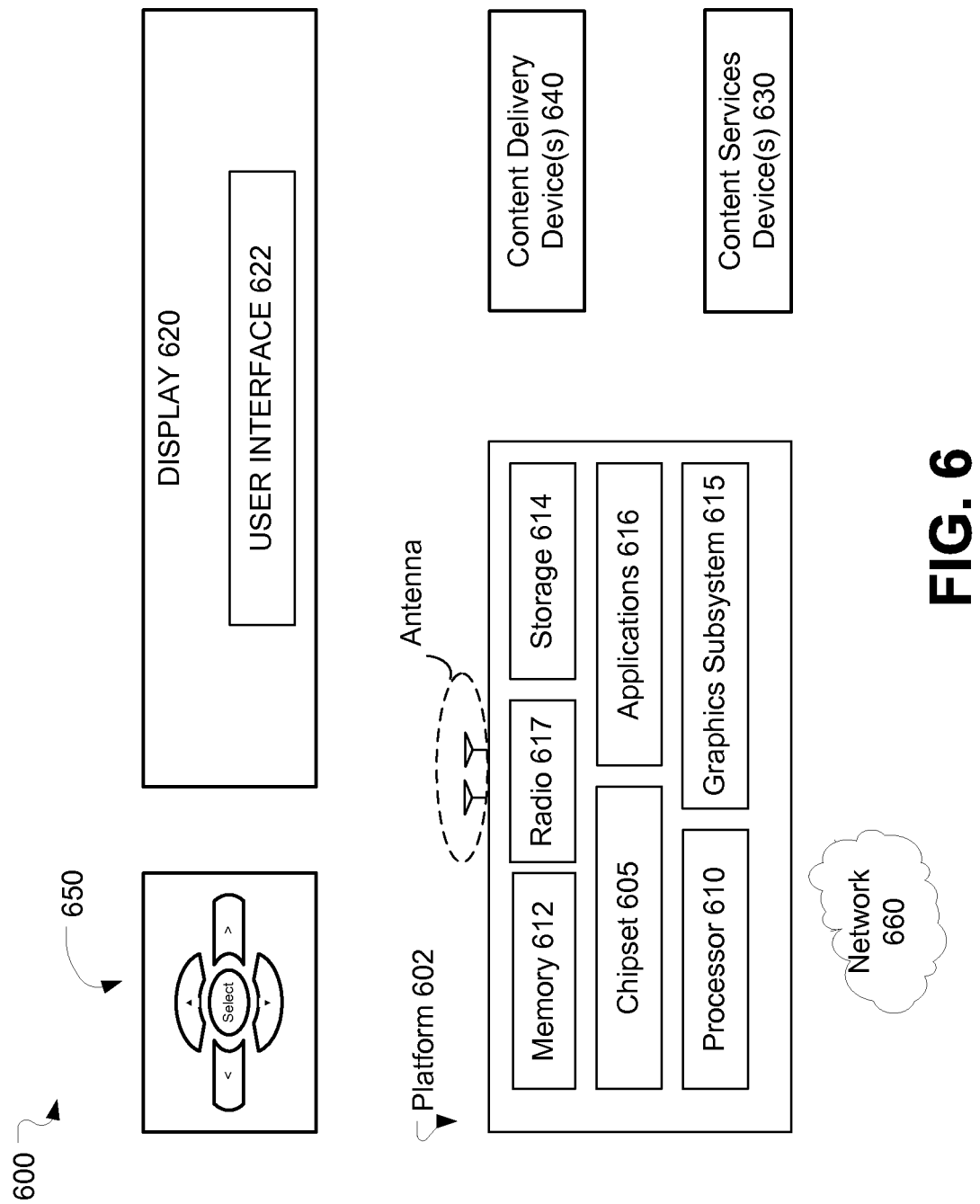
FIG. 6 is a computer system, which may support a mechanism to coordinate activities between a content device and a wireless device based on context awareness in accordance with one embodiment.

FIG. 6 illustrates an embodiment of a video recording system 600. In embodiment, video recording system 600 may be a media system although video recording system 600 is not limited to this context. For example, video recording system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, video recording system 600 comprises a platform 602 (similar to the content device 200 described above) coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these components is described in more detail below.

In embodiments, platform 602 may comprise any combination of a chipset 605, processor 610, memory 612, storage 614, graphics subsystem 615, applications 616, and/or radio 617. In one embodiment, the radio 617 may include a transmitter and a receiver as described above. Chipset 605 may provide intercommunication among processor 610, memory 612, storage 614, graphics subsystem 615, applications 616 and/or radio 617. For example, chipset 605 may include a storage adapter (not depicted) capable of providing intercommunication with storage 614.

Processor 610 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 610 may comprise dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 617 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 617 may operate in accordance with one or more applicable standards in any version.

In embodiments, display 620 may comprise any television type monitor or display. Display 620 may comprise, for example, a computer display screen, touch screen display, video monitor, television-like device, and/or a television. Display 620 may be digital and/or analog. In embodiments, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In embodiments, content services device(s) 630 may be hosted by any national, international and/or independent service and thus accessible to platform 602 via the Internet, for example. In one embodiment, the content services device(s) 630 may be hosted in a cloud. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in video recording system 600 and a content provider via network 660. Examples of content may include any media information including, for example, video, music, medical and gaming information, and so forth.

Content services device(s) 630 receives content such as cable television programming including media information, digital information, and/or other content. Examples of content providers may include any cable or satellite television or radio or Internet content providers. The provided examples are not meant to limit embodiments of the invention.

In embodiments, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but integrated into platform 602 and/or display 620. Embodiments, however, are not limited to the elements or in the context shown or described herein.

In embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off" In addition, chipset 605 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in video recording system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the invention.

In various embodiments, video recording system 600 may be implemented as a wireless system, a wired system, or a combination of both. When implemented as a wireless system, video recording system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, video recording system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
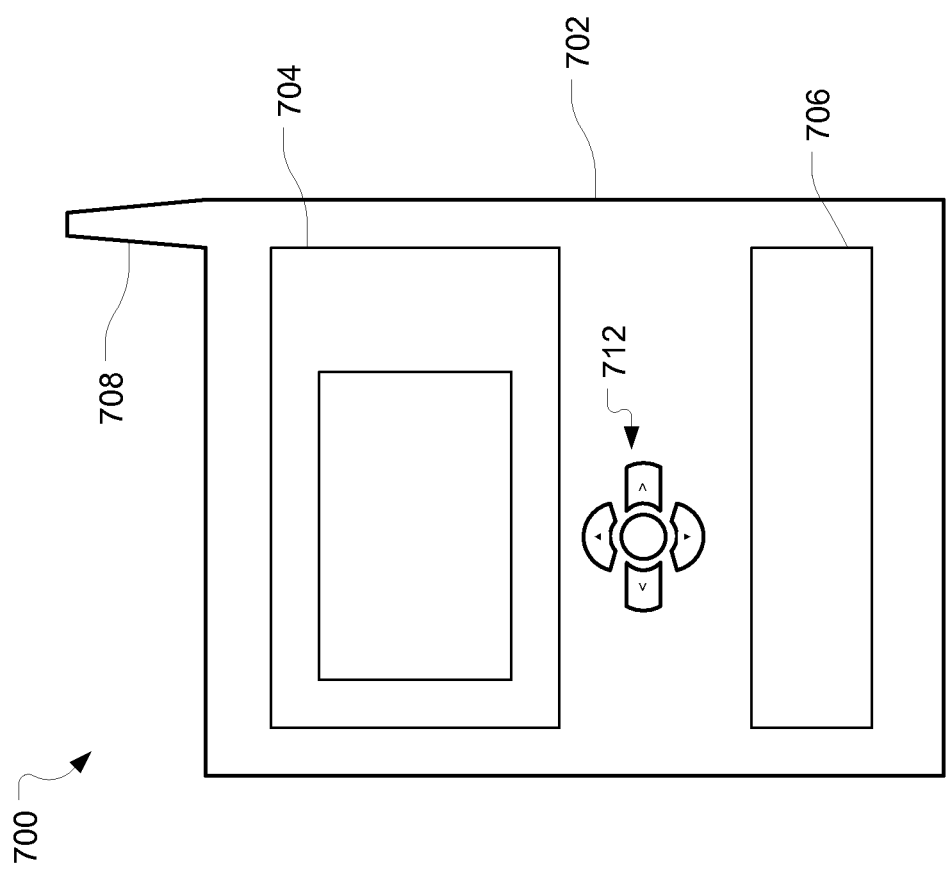
FIG. 7 is a wireless mobile device, which may support a mechanism to coordinate activities between a content device and a wireless device based on context awareness in accordance with one embodiment.

As described above, video recording system 600 may be embodied in varying physical styles or form factors. FIG. 7 illustrates embodiments of a small form factor device 700 in which video recording system 600 may be embodied. Further, the wireless device such as the wireless device 150-A (or 300) may also be embodied in a small factor device like the device 700. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context. The device 700, in one embodiment, may include foldable integrated display panels, which may be unfolded to have a bigger display area.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A content device coupled to a television, comprising:
a front end to couple the content device to the television,
a device discovery block to discover one or more wireless devices present within vicinity of the content device,
a processor coupled to the device discovery block, wherein the processor is to,
pause the television in response to receiving a first notification from the one or more wireless devices discovered within the vicinity of the content device,
start recording a program displayed on the television,
resume display of the content in response to receiving a second notification from the one or more wireless devices discovered within the vicinity of the content device, and
stop recording the program displayed on the television,
wherein the content device is to control the television and recording of the program based on context awareness and without user intervention,
wherein the device discovery block is to, pair the content device with the one or more wireless devices discovered within the vicinity of the content device, send device discovery signals before getting a response discovery signal, and determine whether the one or more wireless devices are present within the vicinity of the content device based on the response discovery signals.

2. The content device of claim 1, wherein the device discovery block is to use a location information stored in the response discovery signals to determine whether the one or more wireless devices are present within the vicinity of the content device.

3. The content device of claim 1 further includes a recording block coupled to the processor, wherein the recording block is to record the program displayed on the television on receiving a signal from the processor.

4. The content device of claim 1 further includes a timer and a message generator coupled to the processor, wherein the message generator is to generate a message if the timer exceeds a count before receiving the second notification.

5. The content device of claim 4, wherein the processor is to cause the program to be saved into a memory if a response to the first message includes a first indication value.

6. The content device of claim 4, wherein the processor is to cause the program to be deleted from a memory if a response to the first message includes a second indication value.

7. The content device of claim 1, wherein the content device is a digital video recorder.

8. A wireless device, comprising:
a device discovery block is to respond to one or more device discovery signals received,
a call indicator block is to detect an occurrence of an incoming call and send a first signal, and
a processor is to,
send a first notification to a content device in response to receiving the first signal,
send a second notification to the content device in response to the call indicator block detecting a call end event,
receive a message if the second notification is not sent and if the wireless device has moved out of the vicinity of the content device, and
send a response including a first indication value in response to receiving the message if a recorded program is to be saved in a memory,
wherein the wireless device is to send the first and second notification based on context awareness and without user intervention.

9. The wireless device of claim 8, wherein the processor is to send a response including a second indication value in response to receiving the message if a recorded program is to be deleted from the memory.

10. The wireless device of claim 8 further comprises a display to show the message to a user of the wireless device.

11. The wireless device of claim 10 further comprises a user interface to receive an input from the user, wherein the input is received in response to the message shown.

12. The wireless device of claim 11, wherein the response includes a first indication value if the input indicates that the recorded program is to be saved.

13. The wireless device of claim 11, wherein the response includes a second indication value if the input indicates that the recorded program is to be deleted.

14. The wireless device of claim 8, wherein the wireless device is a mobile phone.

15. A context aware system, comprising:
a television,
a digital video recorder coupled to the television, and
a mobile phone,
wherein the digital video recorder is to, discover the mobile phone if the mobile phone is present within vicinity of the digital video recorder, pause the television in response to receiving a first notification from the mobile phone, start recording a program displayed on the television, resume display of the content in response to receiving a second notification from the mobile phone and stop recording the program displayed on the television,
wherein the mobile phone is to, generate the first notification in response to detecting an occurrence of an incoming call and the second notification in response to detecting a call end event,
wherein the digital video recorder and the mobile phone is to operate based on context awareness and without user intervention,
wherein the digital video recorder and the mobile phone are to pair with each other in response to discovery of the mobile phone within the vicinity of the content device
wherein the digital video recorder is to use a location information of the mobile phone to determine whether the mobile phone is present within the vicinity of the digital video recorder.

16. The context awareness system of claim 15, wherein the digital video recorder is to,
track a time period elapsed after receiving the first notification, and
send a message to the mobile phone if the second notification is not received before the time period exceeds a time value.

17. The context awareness system of claim 16, wherein the mobile phone is to send a response to the message based on an input received from a user.

18. The context awareness system of claim 17, wherein the response includes a first indication value if the input indicates to save the program.

19. The context awareness system of claim 17, wherein the response includes a second indication value if the input indicates to delete the program.

* * * * *